United States Patent [19]

Merten et al.

[11] Patent Number: 5,636,730

[45] Date of Patent: Jun. 10, 1997

[54] SWITCH HOUSING FOR A MOTOR VEHICLE COMBINED IGNITION AND STARTING SWITCH HAVING AN INSERT FOR AN AUXILIARY DEVICE

[75] Inventors: Jost Merten, Tal-Virtu, Malta; Robert Thalhammer, Munich, Germany

[73] Assignee: Merit-Elektrik GmbH, Gummersbach, Germany

[21] Appl. No.: 314,242

[22] Filed: Sep. 28, 1994

[30] Foreign Application Priority Data

Oct. 5, 1993 [DE] Germany .................. 9315048 U

[51] Int. Cl.$^6$ .................................. H01H 1/64
[52] U.S. Cl. .......................... 200/293; 200/333
[58] Field of Search ........................... 200/293, 294, 200/295, 400, 61.66, 43.03, 333, 303; 220/308, 3.9, 3.2; 141/67

[56] References Cited

U.S. PATENT DOCUMENTS

| 3,654,600 | 4/1972 | Yamamoto | 200/61.66 |
|---|---|---|---|
| 3,723,677 | 3/1973 | Arias | 200/61.66 |
| 4,086,456 | 4/1978 | Bone | 200/294 |
| 5,138,296 | 8/1992 | Borchardt et al. | 200/400 |
| 5,277,232 | 1/1994 | Borsheim | 141/67 |

FOREIGN PATENT DOCUMENTS

| 0497661 | 8/1992 | European Pat. Off. . |
| 1926723 | 11/1970 | Germany . |
| 3318415 | 8/1984 | Germany . |

Primary Examiner—David J. Walczak
Attorney, Agent, or Firm—Michael J. Strike

[57] ABSTRACT

The switch housing for a combined ignition and starting switch of a motor vehicle has a peripheral housing wall (8) having a substantially circular transverse cross-section and a central axis (9) substantially parallel to it, an extended portion (5) laterally projecting approximately tangentially to the peripheral housing wall (8) and displaced laterally from the central axis (9), an insert device (7) held releasably in the extended portion (5) and a snap lock device (16,17,20,21) for releasably holding the insert device (7) in the extended portion (5). The extended portion (5) is provided with a receptacle (2) for the insert device (7) and the receptacle opening (6) for the receptacle (2) is of a size and shape so as to be completely covered by the insert device (7) received in it.

16 Claims, 1 Drawing Sheet

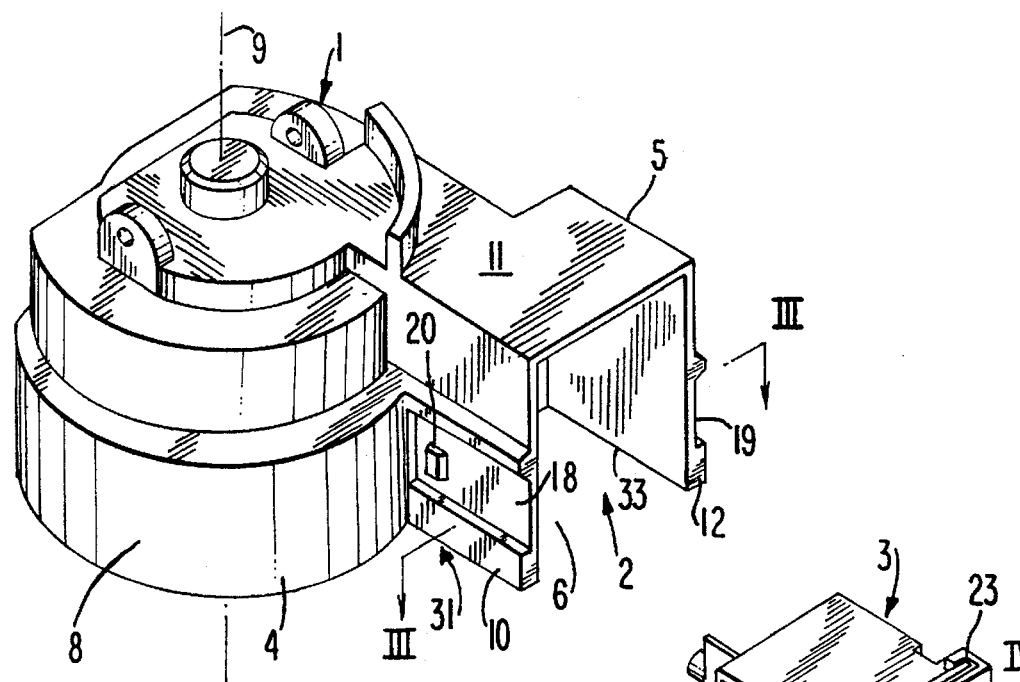
FIG.1
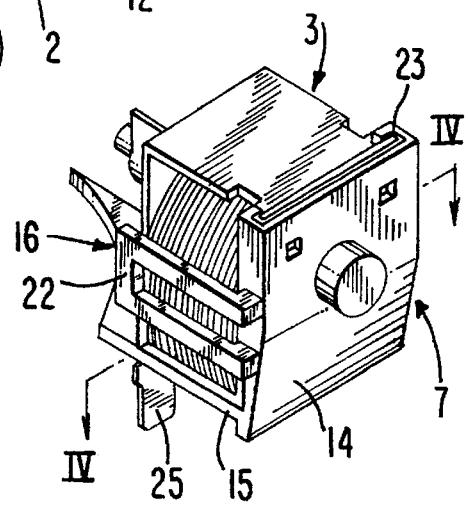
FIG.2
FIG.3
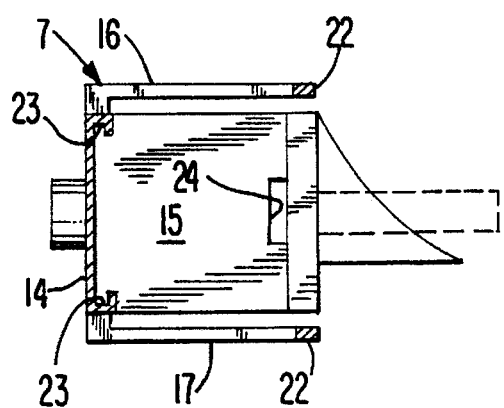
FIG.4
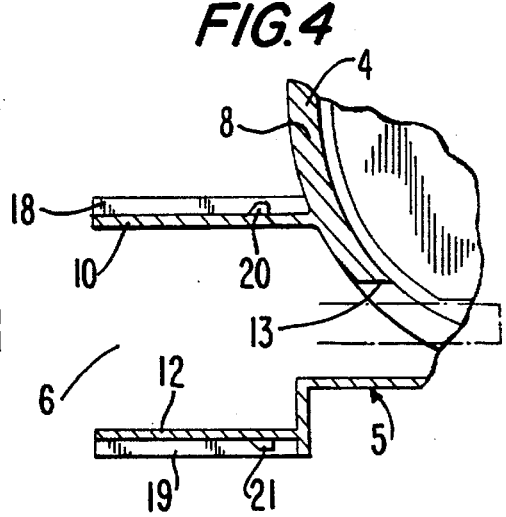

SWITCH HOUSING FOR A MOTOR VEHICLE COMBINED IGNITION AND STARTING SWITCH HAVING AN INSERT FOR AN AUXILIARY DEVICE

BACKGROUND OF THE INVENTION

The present invention relates to a switch housing for a combined ignition and starting switch for a motor vehicle with a receptacle for receiving an insert advantageously containing an auxiliary device, for example for a key removal preventing device cooperating with the switch for preventing removal of the ignition key.

It is required that the ignition and starting switch be equipped with different auxiliary devices during manufacture, or also at a later time according to the different legal requirements or also according to the different desires of the owners of the vehicles. The ignition and starting switch must also be equipped with different auxiliary devices to provide as uniform as possible a manufacture of the various vehicle types and models independently of production location and for later marketing of the vehicles in different countries and continents. This is also necessary so that the component parts can be manufactured in advance.

The combined ignition and starting switch has proven particularly important at a later time also as a deterrent to unauthorized usage and theft of the vehicle.

Combined ignition and starting switches are especially important components for an unobjectionable operation of the motor vehicle. They are designed so that they continue to function reliably throughout the entire lifetime of the vehicle. When such high-quality components must be reinstalled or after-installed because of the differences in safety requirements from one country to the next or because of criminal behavior in the motor vehicle section, presently the only alternative available is to replace the combined ignition and starting switch present with new or other embodiments with the required integrated auxiliary devices. The ignition switch that has been removed or replaced usually however cannot be used again so that an undesirable economical loss occurs.

SUMMARY OF THE INVENTION

It is an object of the present invention to provide switch housing for a combined ignition and starting switch with a receptacle for an auxiliary device, for example for a key removal preventing device, so that the ignition and starting switch can be equipped with any desired auxiliary device as needed during manufacture or also at some later time without structural changes in a simple way and so that it is guaranteed that the ignition and starting switch is operational as such with or without the auxiliary device.

According to the invention the housing of the ignition and starting switch has a laterally projecting extended portion with a receptacle for an insert device advatageously containing the auxiliary device which completely covers the receptacle opening and snap lock means for releasable attachment of the insert device in the housing extended portion.

Because of the present invention the manufacture of both the combined ignition and starting switch and the auxiliary device provided for it is especially simpler and more economical. Great numbers of combined structural components each including an ignition and starting switch and integrated extended portion of the housing including a different insert device containing the different auxiliary device do not need to be manufactured. The combined structural components of the prior art can be mounted in the vehicle only in a united form. The invention not only improves the mounting of the ignition and starting switch and the auxiliary devices in the vehicle, but simplifies the storage requirements in a significant way.

The installation of the insert device both with and without auxiliary device in the housing of the ignition and starting switch is particularly simplified when the housing of the switch has a peripheral housing wall with a substantially circular cross-section, from which the extended portion of the housing provided with the receptacle for the insert device protrudes displaced laterally from a central axis of the switch housing and extending approximately tangential to the peripheral housing wall to which the central axis is parallel.

A particularly well protected installation of the auxiliary device is possible because the receptacle opening for the auxiliary device in the extended portion of the housing is bounded or surrounded by three wall sections each of which is connected perpendicularly to at least one of the other wall sections, which form the receptacle with a lateral wall opening on the underside of the extended portion of the housing, which is closable together with the receptacle opening by the insert device. Furthermore the foregoing structure does not prevent a subsequent or later installation or replacement of an auxiliary device in the ignition and starting switch.

In a preferred embodiment of the ignition and starting switch, the peripheral housing wall is provided with a throughgoing opening in the extended portion just wide enough to allow operation and/or connection of the auxiliary device. Thus when an auxiliary device is not provided in the insert device the operations of the switch are protected.

The preferred insert device is angular shaped and comprises a rear wall which closes the receptacle opening of the extended portion and an insert base extending at right angles to the rear wall which closes the lateral opening on the underside of the extended portion of the housing. This insert device provides a simple and reliable module to hold the auxiliary device and connect it with the ignition switch.

The snap lock means advantageously includes resilient clips extending parallel to each other on respective opposite sides of the insert base from the rear wall and parallel guide grooves in opposing parallel wall sections and lock studs protruding exteriorly from the opposing parallel wall sections in the guide grooves. The guide grooves, the resilient clips and the lock studs are formed in a preferred embodiment so that the resilient clips are inserted in the guide grooves and lock on the lock studs when the insert device is inserted in the receptacle opening so as to be held in the receptacle. The resilient clips are advantageously U-shaped and include a U-shaped crosspiece and the resilient clips are secured in the guide grooves with the U-shaped crosspieces engaging around the lock studs on the opposing parallel wall sections of the extended portion. This type of snap lock means provides an insert device which is user-friendly and long lasting.

In a preferred form of the insert device the rear wall and the insert base are provided with respective retaining grooves and a throughgoing passage for releasable securing the auxiliary device in the insert device.

Advantageously the peripheral housing wall of the substantially circular cross-section is formed in one piece with the extended portion and is made of plastic material. Also the insert device with the resilient clips can also be made in one piece and of plastic material.

BRIEF DESCRIPTION OF THE DRAWING

The objects, features and advantages of the present invention will now be illustrated in more detail by the following detailed description, reference being made to the accompanying drawing in which:

FIG. 1 is a perspective view of a combined ignition and starting switch according to the invention with a receptacle for an insert device;

FIG. 2 is perspective view of a preferred insert device for mounting an auxiliary device in the ignition and starting switch of FIG. 1;

FIG. 3 is a partially cutaway cross-sectional view of the ignition and starting switch of FIG. 1 taken along the section line III—III of FIG. 1; and FIG. 4 is a cross-sectional view of the insert device of FIG. 2 taken along section line IV—IV of FIG. 2.

DESCRIPTION OF THE PREFERRED EMBODIMENT

The ignition and starting switch 1 for a motor vehicle shown in FIG. 1 has a receptacle 2 for an auxiliary device 3, for example a key removal preventing lock for the ignition key or the like cooperating with the mechanism.

The housing 4 of the ignition and starting switch has a laterally projecting extended portion 5 provided with the receptacle 2 having a receptacle opening 6 for an insert device 7 containing the auxiliary device 3. The insert device 7 completely covers the receptacle opening when the insert device 7 is engaged or received in the receptacle 26. Means for releasable attachment of the insert device 7 in the extended portion 5 of the housing 4 are provided.

The housing 4 of the ignition and starting switch 1 has a peripheral housing wall 8 of a substantially circular cross-section and a central axis 9 which is substantially parallel to the peripheral housing wall 8. The extended portion 5 of the housing 4 extends approximately tangentially to the housing wall 8 and is displaced laterally from the central axis 9 of the switch housing 4.

The receptacle opening 6 for the auxiliary device 3 in the extended portion 5 is enclosed or bounded by three wall sections 10, 11, 12, which form the receptacle 2 with a lateral opening 31 on an underside 33 of the housing extended portion 5, which is closable together with the receptacle opening 6 by the insert device 7. The opposing wall sections 10 and 12 are connected perpendicular to the wall section 11 and parallel to each other.

The peripheral housing wall 8 of the switch housing 4 has throughgoing opening 13 for the auxiliary device in the housing extended portion 5, which is only just wide enough as necessary for operation of the auxiliary device 3.

The insert device 7 is angular shaped and includes a rear wall 14 closing the receptacle opening 6 in the housing extended portion 5 and an insert base 15 protruding at right angles to it, which closes the extended portion 5 on its lower side. Resilient clips 16,17 extend on opposite sides of the insert base 15 from the rear wall 14 parallel to each other. These resilient clips 16,17 engage in parallel guide grooves 18,19 on opposite sides of the extended portion 5 of the housing 4 in the opposing parallel wall sections 10,12 and are secured therein by the lock studs 20,21 when the insert device 7 is in an inserted position.

The resilient clips 16,17 are U-shaped and are secured in the inserted position with their U-shaped crosspieces 22 by the lock studs 20,21 projecting from both side walls of the extended portion 5 to the exterior in the guide grooves 18,19.

Retaining grooves 23 are provided in the rear wall 14 of the insert device 7 and a throughgoing hole 24 is provided in the base 15 for attachment of different auxiliary devices. For this purpose a contacting tongue 25 of the auxiliary device 3 can project out through the throughgoing passage 24, for example.

Both the switch housing 4 with the extended portion 5 and the insert device 7 received through the receptacle opening 6 in the housing extended portion 5 with the resilient clips 16,17 extending laterally parallel to each other from the rear wall 14 are made in one piece from a plastic material.

Auxiliary devices 3 of different types can be provided in the insert device 7. The insert device 7 can also be constructed without an auxiliary device in it for closing the lateral receptacle 2 in the extended portion 5 of the housing 4.

While the invention has been illustrated and described as embodied in a combined ignition and starting switch housing for a motor vehicle with an insert for an auxiliary device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A switch housing for an ignition and starting switch of a motor vehicle with means for holding replaceable auxiliary devices, said ignition and starting switch housing (4) comprising a peripheral housing wall (8) having a substantially circular transverse cross-section and a central axis (9) substantially parallel to said peripheral housing wall (8), an extended portion (5) laterally projecting approximately tangentially to the peripheral housing wall (8) and displaced laterally from the central axis (9), an insert device (7) held releasably in the extended portion (5) and snap lock means (16,17; 20,21) for releasably holding the insert device (7) in the extended portion (5);

wherein said extended portion (5) is provided with a receptacle opening (6) for said insert device (7) and said receptacle opening (6) is of a size and shape so as to be completely covered by said insert device (7).

2. The switch housing as defined in claim 1, wherein said extended portion (5) comprises three wall sections (10,11, 12), each of said wall sections being connected perpendicularly to at least one other of said wall sections (10,11,12) so that two of said wall sections are parallel and opposite to each other and so as to form the receptacle (2) with said receptacle opening (6) and a lateral opening (33) on an underside (31) of the extended portion (5), said lateral opening (33) being dimensioned so that said insert device (7) closes said lateral opening (33) in addition to said receptacle opening (6).

3. The switch housing as defined in claim 2, wherein said insert device (7) is adapted to contain an auxiliary device (3), the peripheral housing wall (8) is provided with a throughgoing opening (13) for said auxiliary device in the extended portion (5) and said throughgoing opening (13) is just wide enough to permit operation of said auxiliary device (3).

4. The switch housing as defined in claim 3, wherein said insert device (7) is angular shaped and comprises a rear wall

(14) closing said receptacle opening (6) of said extended portion (5) and an insert base (15) perpendicular to said rear wall (14), said insert base (15) closing said lateral opening (33) on said underside (31) of the extended portion (5).

5. The switch housing as defined in claim 4, wherein said snap lock means (16,17,20,21) includes resilient clips (16, 17) extending parallel to each other on respective opposite sides of said insert base (15) from said rear wall (14) and lock studs (20,21) protruding exteriorly in respective parallel guide grooves (18,19) provided in the parallel ones (10,12) of said three wall sections; and wherein said guide grooves (18,19), said resilient clips (16,17) and said lock studs (20,21) are formed so that said resilient clips (16,17) are inserted in said guide grooves (18,19) and locked on said lock studs (20,21) when said insert device (7) is held in said extended portion (5).

6. The switch housing as defined in claim 5, wherein the insert device (7) with the resilient clips (16,17) protruding from the rear wall (14) parallel to each other is made in one piece from a plastic material.

7. The switch housing as defined in claim 5, wherein each of said resilient clips (16,17) is U-shaped and includes a crosspiece (22) and said resilient clips (16,17) are secured in said guide grooves (18,19) with said crosspieces (22) engaging around said lock studs (20,21) on said opposing parallel wall sections (10,12) of said extended portion (5).

8. The switch housing as defined in claim 7, wherein said rear wall (14) is provided with retaining grooves (23) for replaceably securing said auxiliary device (3) in said insert device (7).

9. The switch housing as defined in claim 7, wherein said insert base (15) is provided with a throughgoing passage (24) for replaceably securing said auxiliary device (3) in said insert device (7).

10. The switch housing as defined in claim 7, wherein said rear wall (14) is provided with retaining grooves (23) and said insert base (15) is provided with a throughgoing passage (24) for releasably securing said auxiliary device (3) in said insert device (7).

11. The switch housing as defined in claim 1, wherein said peripheral housing wall (8) and said extended portion (5) are made of plastic material in one piece.

12. A switch housing for an ignition and starting switch of a motor vehicle in combination with an auxiliary device (3) for preventing removal of an ignition key, said ignition and starting switch housing (4) comprising a peripheral housing wall (8) having a substantially circular transverse cross-section and a central axis (9) substantially parallel to said peripheral housing wall (8), an extended portion (5) laterally projecting approximately tangentially to the peripheral housing wall (8), provided with a receptacle (2) and displaced laterally from the central axis (9), an insert device (7) containing said auxiliary device (3) and held releasably in the receptacle (2) and snap lock means (16,17,20,21) for releasably holding the insert device (7) received in said receptacle (2) provided in the extended portion (5);

wherein said extended portion (5) is provided with a receptacle opening (6) for said receptacle (2) and said receptacle opening (6) is of a size and shape so as to be completely covered by said insert device (7).

13. The switch housing and the auxiliary device (3) as defined in claim 12, wherein said extended portion (5) comprises three wall sections (10,11,12), each of said wall sections being connected perpendicularly to at least one other of said wall sections so that two of said wall sections are parallel and opposite to each other and so as to form said receptacle opening (6) and a lateral opening (33) on an underside (31) of the extended portion (5), and said lateral opening (33) is dimensioned so that said insert device (7) closes said lateral opening (33) in addition to said receptacle opening (6).

14. The switch housing and the auxiliary device (3) as defined in claim 13, wherein said insert device (7) is angular shaped and comprises a rear wall (14) closing said receptacle opening (6) of said extended portion (5) and an insert base (15) perpendicular to said rear wall (14) and closing said lateral opening (33) on said underside (31) of the extended portion (5).

15. The switch housing and the auxiliary device (3) as defined in claim 14, wherein said snap lock means (16,17, 20,21) includes resilient clips (16,17) extending parallel to each other on respective opposite sides of said insert base (15) from said rear wall (14), parallel guide grooves (18,19) in the parallel ones (10,12) of said three wall sections (10,11,12) of said extended portion (5) and lock studs (20,21) protruding exteriorly from said opposing parallel wall sections (10,12) in said guide grooves (18,19); and wherein said guide grooves (18,19), said resilient clips (16,17) and said lock studs (20,21) are formed so that said resilient clips (16,17) are inserted in said guide grooves (18,19) and lock on said lock studs (20,21) when said insert device (7) is held in said extended portion (5).

16. The switch housing and the auxiliary device (3) as defined in claim 15, wherein each of said resilient clips (16,17) is U-shaped and includes a crosspiece (22) and said resilient clips (16,17) are secured in said guide grooves (18,19) with said crosspieces (22) engaging around said lock studs (20,21) on said opposing parallel wall sections (10,12) of said extended portion (5).

\* \* \* \* \*